(12) United States Patent
Xu et al.

(10) Patent No.: US 11,096,042 B2
(45) Date of Patent: Aug. 17, 2021

(54) PREPROCESSING METHOD AND DEVICE FOR CONFIGURING NFC SMART CARD

(71) Applicant: Xiaomi Digital Technology Co., Ltd., Beijing (CN)

(72) Inventors: Lina Xu, Beijing (CN); Shaoqiang Yang, Beijing (CN); Yonggang Gou, Beijing (CN)

(73) Assignee: Xiaomi Digital Technology Co., Ltd., Beijing (CN)

( * ) Notice: Subject to any disclaimer, the term of this patent is extended or adjusted under 35 U.S.C. 154(b) by 0 days.

(21) Appl. No.: 16/843,351

(22) Filed: Apr. 8, 2020

(65) Prior Publication Data
US 2021/0136562 A1 May 6, 2021

(30) Foreign Application Priority Data
Oct. 31, 2019 (CN) .......................... 201911054929.1

(51) Int. Cl.
*H04W 8/22* (2009.01)
*H04W 4/80* (2018.01)

(52) U.S. Cl.
CPC .............. *H04W 8/22* (2013.01); *H04W 4/80* (2018.02)

(58) Field of Classification Search
CPC ......... H04W 8/22; H04W 4/80; H04W 12/40; H04W 12/42; H04W 12/45; H04W 12/47; H04W 12/48; H04W 12/50; H04W 12/63; H04W 12/30; H04W 12/33; H04W 12/00; H04W 12/009; H04W 12/02; H04W 88/02; H04W 4/50; H04W 4/60; H04W 12/35; H04W 12/55; H04W 8/205; H04W 8/24; H04W 8/245; G06K 7/0034; G06K 7/0039; G06K 7/0043; G06K 19/0723; G06K 19/0719; G06K 19/07749; G06K 19/07739; G06K 19/07741; G06K 7/0719;
(Continued)

(56) References Cited

U.S. PATENT DOCUMENTS 9,769,780 B2 * 9/2017 El Mghazli et al. ........................
H04W 60/005
10,007,873 B2 * 6/2018 Heo et al. .......... G06K 19/0725
(Continued)

FOREIGN PATENT DOCUMENTS

CN 107729156 A 2/2018
EP 2 584 769 A1 4/2013

OTHER PUBLICATIONS

European Search Report in European Application No. 20171800.4, dated Oct. 7, 2020.

*Primary Examiner* — Meless N Zewdu
(74) *Attorney, Agent, or Firm* — Finnegan, Henderson, Farabow, Garrett & Dunner, L.L.P.

(57) ABSTRACT

A preprocessing method for configuring a near field communication (NFC) smart card, includes: determining a card set belonging to a user; generating identifier information corresponding to the card set according to a non-contact parameter corresponding to a card included in the card set, the identifier information identifying at least one of a state of conflict or a state of compatibility between two cards included in the card set; and sending the identifier information to electronic equipment used by the user, such that the electronic equipment adds, to an NFC smart card according to the identifier information, at least two cards compatible with each other in the card set.

9 Claims, 14 Drawing Sheets server 101     electronic equipment 102

(58) Field of Classification Search
CPC ............... G06Q 20/105; G06Q 20/352; G06Q 20/3555; G06Q 20/357; G06Q 20/32; G06F 9/52; H04M 1/725; H04M 1/675; H04M 3/387; H04M 15/751
See application file for complete search history.

(56) References Cited

U.S. PATENT DOCUMENTS

| | | | |
|---|---|---|---|
| 2009/0098825 A1* | 4/2009 | Huomo et al. | 455/41.1 |
| 2012/0034868 A1 | 2/2012 | Fine et al. | |
| 2013/0102246 A1* | 4/2013 | Gagne et al. | 455/41.1 |
| 2013/0121493 A1* | 5/2013 | von Behren et al. | 380/270 |
| 2014/0052630 A1* | 2/2014 | Bona et al. | G06Q 20/34 |
| 2015/0356791 A1* | 12/2015 | Jo | G07B 15/00 |
| 2016/0019381 A1* | 1/2016 | Yang et al. | G06F 21/34 |
| 2017/0142159 A1* | 5/2017 | Li et al. | H04L 63/20 |
| 2018/0129925 A1* | 5/2018 | Guo et al. | G06K 19/0727 |
| 2019/0245848 A1* | 8/2019 | Divoux et al. | H04L 63/0853 |

* cited by examiner

PREPROCESSING METHOD AND DEVICE FOR CONFIGURING NFC SMART CARD

CROSS-REFERENCE TO RELATED APPLICATIONS

This application is based on and claims priority to Chinese Application No. 201911054929.1 filed on Oct. 31, 2019, the content of which is incorporated by reference in its entirety.

TECHNICAL FIELD

The present disclosure generally relates to the technical field of computer communication, and more particularly, to a preprocessing method and device for configuring a near field communication (NFC) smart card.

BACKGROUND

NFC, also known as short distance wireless communication, is a high-frequency wireless communication technology for realizing non-contact inter-equipment data transmission. With continuous improvement of NFC technology, the NFC technology has been applied widely to mobile equipment. Based on an NFC module in mobile equipment, a user may communicate, in a screen deactivated state, with an application in a card reading terminal.

SUMMARY

According a first aspect, a preprocessing method for configuring a near field communication (NFC) smart card includes: determining a card set belonging to a user; generating identifier information corresponding to the card set according to a non-contact parameter corresponding to a card included in the card set, the identifier information identifying at least one of a state of conflict or a state of compatibility between two cards included in the card set; and sending the identifier information to electronic equipment used by the user, such that the electronic equipment adds, to an NFC smart card according to the identifier information, at least two cards compatible with each other in the card set.

According a second aspect, a server includes a processor and a memory storing an instruction executable by the processor. The processor is configured to perform a preprocessing method for configuring a near field communication (NFC) smart card includes: determining a card set belonging to a user; generating identifier information corresponding to the card set according to a non-contact parameter corresponding to a card included in the card set, the identifier information identifying at least one of a state of conflict or a state of compatibility between two cards included in the card set; and sending the identifier information to electronic equipment used by the user, such that the electronic equipment adds, to an NFC smart card according to the identifier information, at least two cards compatible with each other in the card set.

According a third aspect, a non-transitory computer-readable storage medium has stored thereon instructions that, when executed by a processor of a server, cause the server to perform the preprocessing method according to the first aspect.

The above general description and the detailed description below are exemplary and explanatory, and do not limit the disclosure.

BRIEF DESCRIPTION OF THE ACCOMPANYING DRAWINGS

The drawings are incorporated in and constitute part of the specification, illustrate embodiments consistent with the disclosure, and together with the disclosure, serve to explain the principle of the disclosure.

DETAILED DESCRIPTION

Reference will now be made in detail to exemplary embodiments, examples of which are illustrated in the accompanying drawings. The following description refers to the accompanying drawings, in which the same numbers in different drawings represent the same or similar elements unless otherwise represented. Implementations set forth in the following exemplary embodiments do not represent all implementations in accordance with the present disclosure. Rather, they are mere examples of devices and methods consistent with certain aspects of the present disclosure as recited in the accompanying claims.

Terms used in the present disclosure are merely for describing exemplary embodiments instead of limiting the disclosure. For example, the term "and/or" used herein may refer to and contain any combination or all possible combinations of one or more associated listed items. The terms such as "first," "second," "third" may be used to describe various kinds of information, which should not be limited to such a term. For example, without departing from the scope of the embodiments herein, first information may also be referred to as second information. Similarly, second information may also be referred to as first information.

Figure 1A:
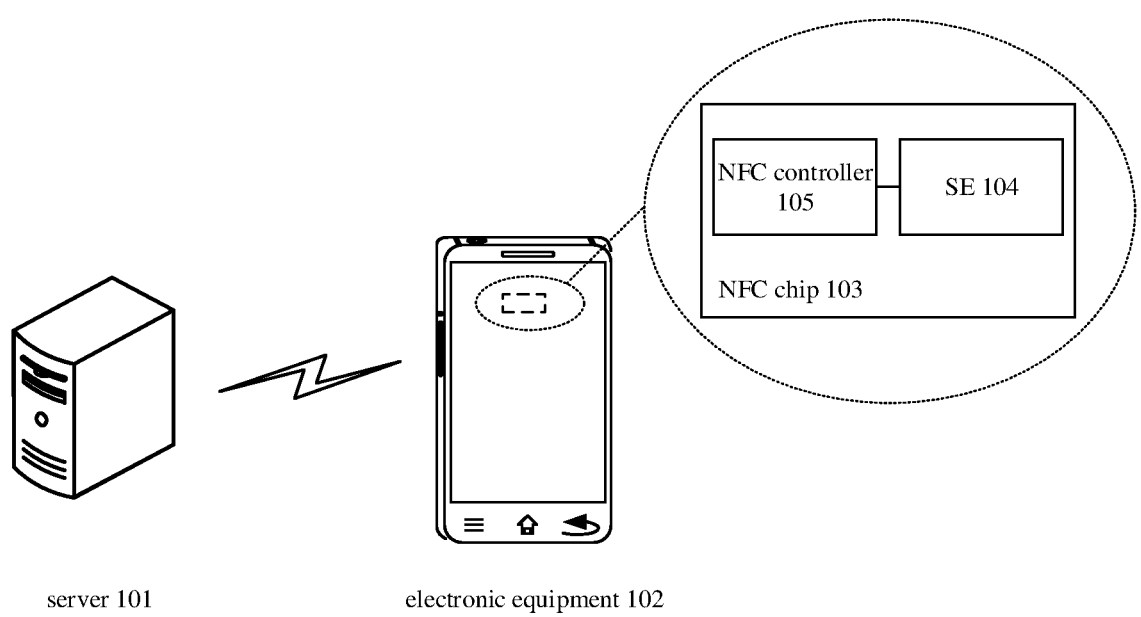
FIG. 1A is a schematic diagram of a communication system for configuring an NFC smart card according to an exemplary embodiment.

FIG. 1A is a schematic diagram of a communication system for configuring an NFC smart card according to an exemplary embodiment. A preprocessing method for configuring an NFC smart card may be applied to the communication system, which includes a server 101 and electronic equipment 102. As shown in FIG. 1A, the server 101 may be connected to the electronic equipment 102 via a communication network. The communication network may be a wide area network, a metropolitan area network, a local area network, etc. The server 101 may communicate, via one or more communication networks, with an application (APP) installed on the electronic equipment 102, to manage one or more NFC cards set in the APP as well as data related thereto. The electronic equipment 102 may be a smart mobile phone, a smart watch, a tablet computer, etc.

An NFC chip 103 may be installed in the electronic equipment 102. The NFC chip 103 may include a secure element (SE) 104 (or an embedded secure element (ESE)), an NFC controller 105, etc. The SE 104 may be integrated into a subscriber identity module (SIM) card, and manufactured and sold by a telecom operator. The SE 104 may be integrated onto a printed circuit board (PCB) of the electronic equipment 102. The SE 104 may be integrated into a secure digital (SD) memory card. When integrated on a PCB of the electronic equipment 102, the SE 104 may be independent of other software and hardware of the electronic equipment 102.

A non-contact communication front-end of the NFC chip 103 may receive a command sent by an external reader, and forward the command to the SE 104. The SE 104 may process the command A result of the processing may be returned through the NFC controller 105. The SE 104 may manage a card belonging to a user based on an APP. The SE 104 may be understood as having a complete set of a Central Processing Unit (CPU), Read-Only Memory (ROM), Electrically Erasable Programmable Read-Only Memory (EEPROM), Random Access Memory (RAM), an Input/Output (I/O) interface, etc. As required by an application, the SE 104 may also serve to process a key algorithm, to support an encryption and/or decryption algorithm such as a Data Encryption Standard (DES), an Advanced Encryption Standard (AES), a Rivest-Shamir-Adleman (RSA) algorithm, etc., thereby strengthening access control. In an embodiment, only a certified APP may access the SE 104 and perform communication and interaction. The SE 104 may also serve to secure supporting data isolation in electronic equipment, to provide security and confidentiality.

The server 101 may issue APP data of a card to the NFC chip 103 in a number of modes. For example, a manufacturer of the electronic equipment 102 may issue a card. Then, an administrator may decide how to control a key to the SE 104 in the NFC chip 103. Information on a key to the NFC chip 103 may be acquired directly from a publisher of the chip based on a relation of cooperation between APPs. Then, the server 101 may issue APP data of a card to the NFC chip 103 based on the information on the key. In some embodiments, this may be done with the help of an SE publisher's Trusted Service Manager (SE-TSM) agent. The process of issuing APP data of a card to the NFC chip 103 by the server 101 is not limited in the embodiments.

Figure 1B:
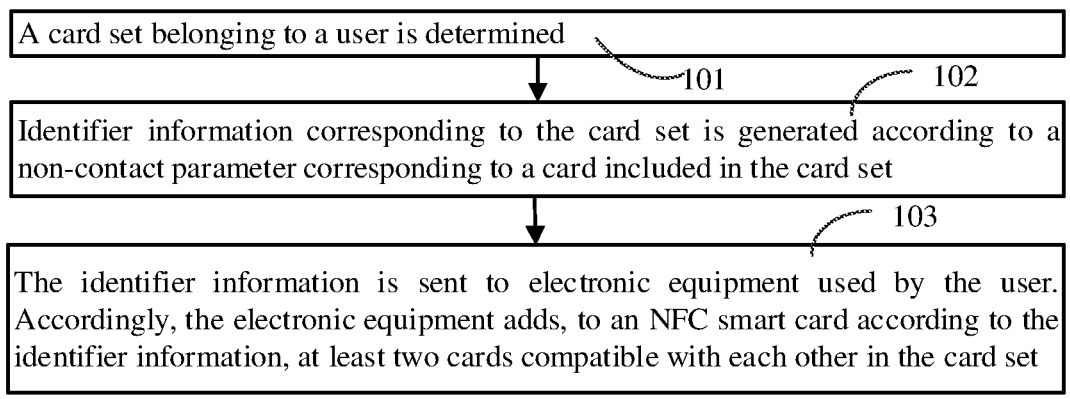
FIG. 1B is a flowchart of a preprocessing method for configuring an NFC smart card according to an exemplary embodiment.

FIG. 1B is a flowchart of a preprocessing method for configuring an NFC smart card according to an exemplary embodiment. As shown in FIG. 1B, the method may be applied to a server, and include the following options.

In option 101, a card set belonging to a user is determined.

In an embodiment, a user may manually input, in an APP on electronic equipment used by the user, card information to be uploaded. The APP may be configured to manage the card set. Accordingly, the electronic equipment may upload the card information input by the user to the server.

In an embodiment, the electronic equipment may acquire, based on NFC, card information on a card held against the electronic equipment. Then, the electronic equipment may send the card information acquired to the server. The electronic equipment may acquire card information with improved accuracy by directly acquiring, based on NFC, the card information on a card held against the electronic equipment, which also simplifies an operation of a user, and improves efficiency of the electronic equipment in determining the card set belonging to the user.

In option 102, identifier information corresponding to the card set is generated according to a non-contact parameter corresponding to a card included in the card set. The identifier information identifies a state of conflict and/or a state of compatibility between two cards included in the card set.

In an embodiment, the identifier information corresponding to the card set may be generated according to the non-contact parameter corresponding to the card included in the card set as follows. The identifier information identifying the state of compatibility between two cards both with no non-contact parameter in the card set may be generated. The identifier information identifying the state of compatibility between two cards with identical non-contact parameters in the card set may be generated. The identifier information identifying the state of conflict between two cards with different non-contact parameters in the card set may be generated. The identifier information identifying the state of conflict between a card with no non-contact parameter and a card with a non-contact parameter in the card set may be generated.

In option 103, the identifier information is sent to the electronic equipment used by the user. Accordingly, the electronic equipment may add, to an NFC smart card according to the identifier information, at least two cards compatible with each other in the card set.

In an embodiment, information on a change in a card of the user may be received. A change instruction may be determined based on the information on the change in the card.

In an embodiment, the change instruction may be sent to the electronic equipment of the user. Accordingly, the electronic equipment may update, according to the change instruction, a stored card set and state information related to the card to be updated in the identifier information. In an embodiment, card information corresponding to the information on the change in the card may be determined. State information related to the card information in the identifier information may be updated according to the change instruction.

Further, if the information on the change in the card is information on deletion of the card, a card deletion instruction corresponding to the information on deletion of the card may be generated. If the information on the change in the card is information on addition of the card, a card addition instruction corresponding to the information on addition of the card may be generated.

In the embodiments, a server may determine a card set belonging to a user. The server may generate identifier information corresponding to the card set according to a non-contact parameter corresponding to a card included in the card set. The identifier information may identify a state of conflict and/or a state of compatibility between two cards included in the card set. The server may send the identifier information to electronic equipment used by the user. Accordingly, the electronic equipment may add, to an NFC smart card according to the identifier information, at least two cards compatible with each other in the card set. The electronic equipment used by the user may determine compatible cards in the card set conveniently based on the identifier information, without having to analyze cards in the card set as well as a relation of conflict or compatibility therein, improving efficiency in configuration by the electronic equipment.

Embodiments of the present disclosure may include one or more of a first process where a server issues card information to electronic equipment, a second process where the electronic equipment configures an NFC smart card based on the card information received, and a third process of NFC card switch.

In the first process, a server may issue a card to electronic equipment.

In an embodiment, the server may preprocess the card to be issued, by determining a card set belonging to a user receiving the card set as well as determining identifier information corresponding to the card set, and then sending the card set including the identifier information to electronic equipment used by the user, such that the electronic equipment may configure an NFC smart card with improved efficiency based on cards included in the card set issued.

Figure 2A:
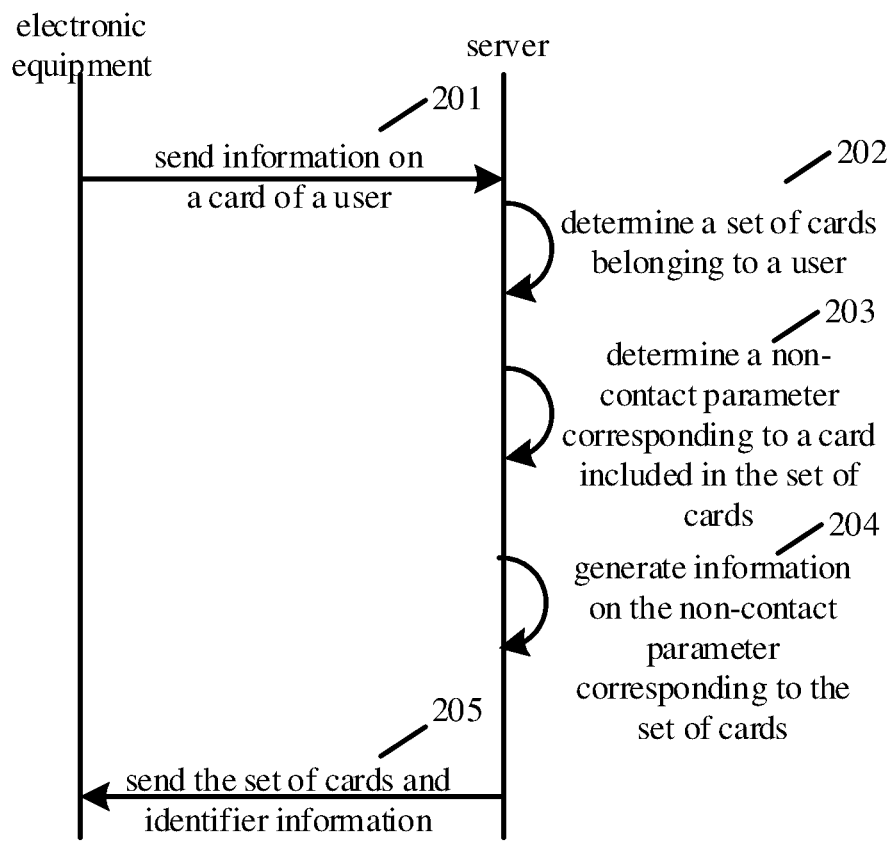
FIG. 2A is a schematic diagram of a preprocessing method for configuring an NFC smart card according to an exemplary embodiment.

FIG. 2A is a schematic diagram of a preprocessing method for configuring an NFC smart card according to an exemplary embodiment. Referring to FIG. 2A, the method may be applied to a server, and include the following options.

In option 201, electronic equipment may send information on a card of a user to a server.

For example, the user may upload card information on the card to the server through electronic equipment used by the user.

In an embodiment, the user may manually input, in an APP on electronic equipment used by the user, card information to be uploaded. The APP may be configured to manage the card set. Accordingly, the electronic equipment may upload the card information input by the user to the server. Card information input may include a card number, information on a card holder, etc. Information on a card holder may include contact information of the card holder, a name of the card holder, an ID card number of the card holder, etc.

In addition, the card number may be acquired by the user with a photographing function of the electronic equipment. Accordingly, the electronic equipment may automatically identify a card number corresponding to a card to be added based on a card number acquired by photography. A photo with the card number may be acquired with the photographing function. The card number of the card to be added may be determined by real-time analysis of the photo acquired, simplifying user operation, improving efficiency in entering a card number.

During the input, the user may first determine a card type of a card to be uploaded. Then, the user may be led to an interface for inputting card information. The card type may include an ID card, a ticket card, etc. The ID card may include a bank card, a fuel card, a parking card, a bus card, an access card, a membership card, a score card, etc. The ticket card may include an air ticket, a train ticket, a coupon, a movie ticket, etc.

Figure 2B:
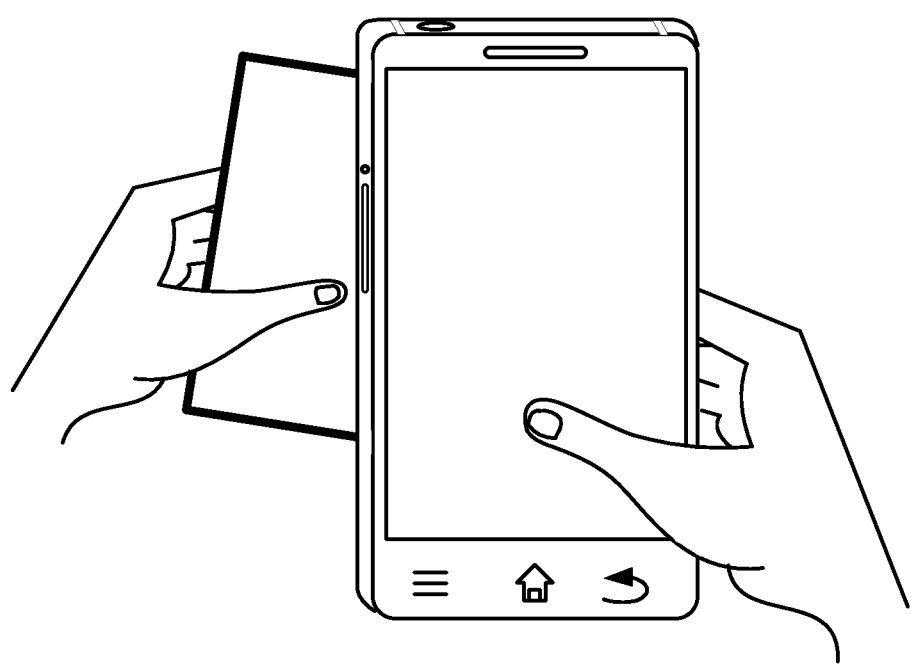
FIG. 2B is a schematic diagram of an application scene of adding a card according to an exemplary embodiment.

In an embodiment, the electronic equipment may acquire, based on NFC, card information on a card held against the electronic equipment. Then, the electronic equipment may send the card information acquired to the server. FIG. 2B is a diagram of an application scene of adding a card according to an exemplary embodiment. As shown in FIG. 2B, a user may hold a card against a designated area of the electronic equipment used by the user. Then, the electronic equipment may acquire, based on NFC, card information to be uploaded. In this process, the user does not have to manually input information in a card adding interface, improving efficiency in entering card information.

Before and after card information is acquired, a prompt message, such as "Please hold the card against the back of the equipment.", "Hold on, please. The card information is being acquired.", etc., may be presented to the user in a display interface of the electronic equipment used by the user. The prompt message may inform the user of a progress in information acquisition, avoiding interruption of the information acquisition by the electronic equipment due to a misoperation.

In option 202, the server may determine a set of cards belonging to the user.

In an embodiment, the server may maintain a set of cards, i.e., the card set, belonging to a user. After a card in the card set has been activated, the card may be uploaded to the server by a user through electronic equipment used by the user. Then, the server may maintain card information received in real time. An administrator may dynamically configure card information in a server periodically based on a data file.

The server may maintain the card set belonging to a user as follows. Application data related to a card may be recorded dynamically. In an embodiment, APP data recorded may include a name of a user, a card number, a date when the card is activated, etc. The server may send information, such as a name of a card holder of a card received, a card number, etc., to a service provider. Accordingly, the service provider may return token information authorized by the service provider. The server may store the acquired token information in association with the card. In an embodiment, the server may maintain just information on an identifier of a card, and only the information on the identifier of the card may be sent to the electronic equipment. Accordingly, while the card is being added to an NFC smart card, information related to the card may be added based on interaction with the user.

In option 203, the server may determine a non-contact parameter corresponding to a card included in the card set.

In an embodiment, a non-contact parameter of a card when the card is installed in an SE may be determined as a non-contact parameter of the card. The non-contact parameter of a card at installation may be determined based on configuration information of the card to be installed. In addition, the server may store a relation of mapping between a non-contact parameter and a card. The server may dynamically maintain the relation of mapping stored based on configuration information corresponding to a card.

In option 204, the server may generate identifier information corresponding to the card set according to the non-contact parameter determined.

Identifier information corresponding to the card set may be generated according to the non-contact parameter corresponding to a card included in the card set. Accordingly, the identifier information generated may reflect a state of conflict between two cards included in the card set. The identifier information generated may reflect a state of compatibility between two cards included in the card set. The identifier information generated may reflect a state of conflict and a state of compatibility between two cards included in the card set.

In an embodiment, for each card in the card set, a card in the card set that conflicts or is compatible with the each card may be determined based on the non-contact parameter corresponding to the each card.

The state of conflict between two cards in the card set may be determined according to a rule as follows. If a card under consideration has no non-contact parameter, any other card in the card set having no non-contact parameter may be determined to be compatible with the card under consideration. If a card under consideration has no non-contact parameter, any card in the card set having a non-contact parameter may be determined to conflict with the card under consideration. If a card under consideration has a non-contact parameter, any card in the card set having the same non-contact parameter may be determined to be compatible with the card under consideration. If a card under consideration has a non-contact parameter, any card in the card set having a non-contact parameter differing from the non-contact parameter of the card under consideration may be determined to conflict with the card under consideration.

In an embodiment, identifier information may be set as follows, and a non-contact parameter may involve a parameter tag, a parameter format, a parameter type, etc. For illustrative purposes only, a value of a non-contact parameter may be expressed by Parameter*. For example, the card set may include a card A, a card B, a card C, a card D, and a card E. The card A may correspond to a non-contact Parameter1. The card B may correspond to a non-contact Parameter2. The card C may correspond to the non-contact Parameter1. The cards D and E may correspond to no non-contact parameter. Accordingly, for the card A having the non-contact parameter Parameter1, the card C having the same non-contact parameter Parameter1 may be in a state of compatibility with the card A, while the card B having the non-contact parameter Parameter2, the card D and the card E having no non-contact parameter are cards conflicting with the card A. For the card D having no non-contact parameter, the card E also having no non-contact parameter may be compatible with the card D, and the card A having the non-contact parameter Parameter1 and the card B having the non-contact parameter Parameter2 may both conflict with the card D having no non-contact parameter. Similarly, for the card B having the non-contact parameter Parameter2, the card A and the card C having the non-contact parameter Parameter1, and the card D and the card E having no non-contact parameter may be cards conflicting with the card B.

In an embodiment, a card may be categorized according to existence or nonexistence of a non-contact parameter and to a value of an existing non-contact parameter corresponding to the card. Then, cards under one category may be identified as being compatible with each other. Cards under different categories may be identified as conflicting with each other.

A card in the card set having no non-contact parameter may belong to the category having no non-contact parameter. Accordingly, the identifier information identifying the state of compatibility may be generated for two cards in the card set that both have no non-contact parameter. Similarly, the identifier information identifying the state of compatibility may be generated for two cards in the card set that both have the same non-contact parameter. The identifier information identifying the state of conflict may be generated for two cards in the card set that have different non-contact parameters, or for a card in the card set that has a non-contact parameter and a card in the card set that has no non-contact parameter.

For example, the card set may consist of cards A through E. The card A may have a non-contact parameter Parameter1. The card B may have a non-contact parameter Parameter2. The card C may have the non-contact parameter Parameter1. The card D may have no non-contact parameter. The card E may have no non-contact parameter. In an embodiment, cards in a card set may be categorized into a category having no non-contact parameter, a category having the non-contact parameter Parameter1, and a category having the non-contact parameter Parameter2. The category having no non-contact parameter may include the card D and the card E. The category having the non-contact parameter Parameter1 may include the card A and the card C. The category having the non-contact parameter Parameter2 may include the card B. Accordingly, the identifier information identifying the state of compatibility may be generated for the card D and the card E. The identifier information identifying the state of compatibility may be generated for the card A and the card C. The identifier information identifying the state of conflict may be generated for the card B and the card A. The identifier information identifying the state of conflict may be generated for each two of the card B, the card A, and the card D. The way of expressing the identifier information is not limited in the embodiments. Any expression of the identifier information capable of expressing the state of conflict or the state of compatibility between two cards shall fall within the scope of the disclosure.

In option 205, the server may send the card set and identifier information corresponding to the card set to the electronic equipment used by the user.

In an embodiment, identifier information generated for the card set and the card set may be sent to the electronic equipment used by the user. Accordingly, the electronic equipment may add, to an NFC smart card according to the identifier information, at least two cards compatible with each other in the card set. Cards with identical non-contact parameters may be of identical parameter types and have identical parameter values. Accordingly, no conflict between the cards may occur during configuration or application. Thus, NFC interaction may be performed using the cards based on one smart card.

In the embodiments, the server may generate identifier information corresponding to a card set constituted by cards belonging to the user. The identifier information may identify a state of conflict and/or a state of compatibility between two cards in the card set. The electronic equipment of the user may receive the card set including the identifier information. The electronic equipment may determine compatible cards in the card set conveniently based on the identifier information, without having to analyze cards in the card set as well as a relation of conflict or compatibility therein, improving efficiency in configuration by the electronic equipment.

Figure 3:
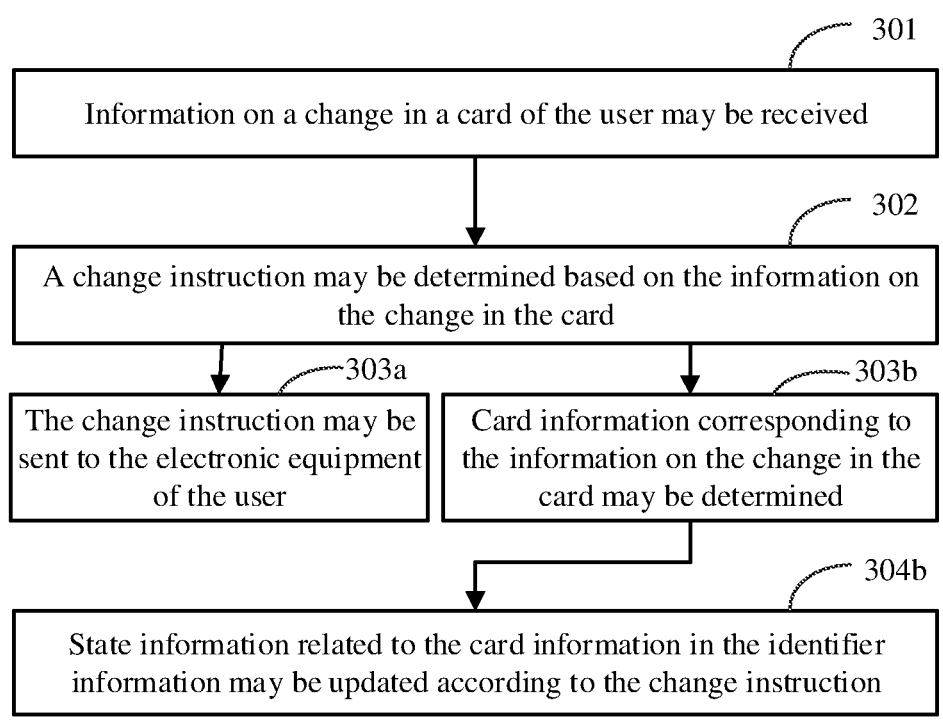
FIG. 3 is a flowchart of a preprocessing method for configuring an NFC smart card according to an exemplary embodiment.

FIG. 3 is a flowchart of a preprocessing method for configuring an NFC smart card according to an exemplary embodiment. As shown in FIG. 3, the method may include the following options.

In option 301, information on a change in a card of a user may be received.

In an embodiment, the user may manage, through electronic equipment, cards in a card set belonging to the user. Information on a change generated after the management may be sent to a server through the electronic equipment. An APP for managing a card set may be a native APP pre-installed before the electronic equipment leaves a factory, such as Mi Wallet and UnionPay Wallet, etc. The APP may implement a function related to NFC using a virtual card solution based on an SE. Alternatively, the APP may be one downloaded subsequently by the user from an application store. The user may change a card in the card set through an APP in the electronic equipment. The user may add a card. The user may delete a card. The user may change card information on an existing card in the card set.

Figure 4:
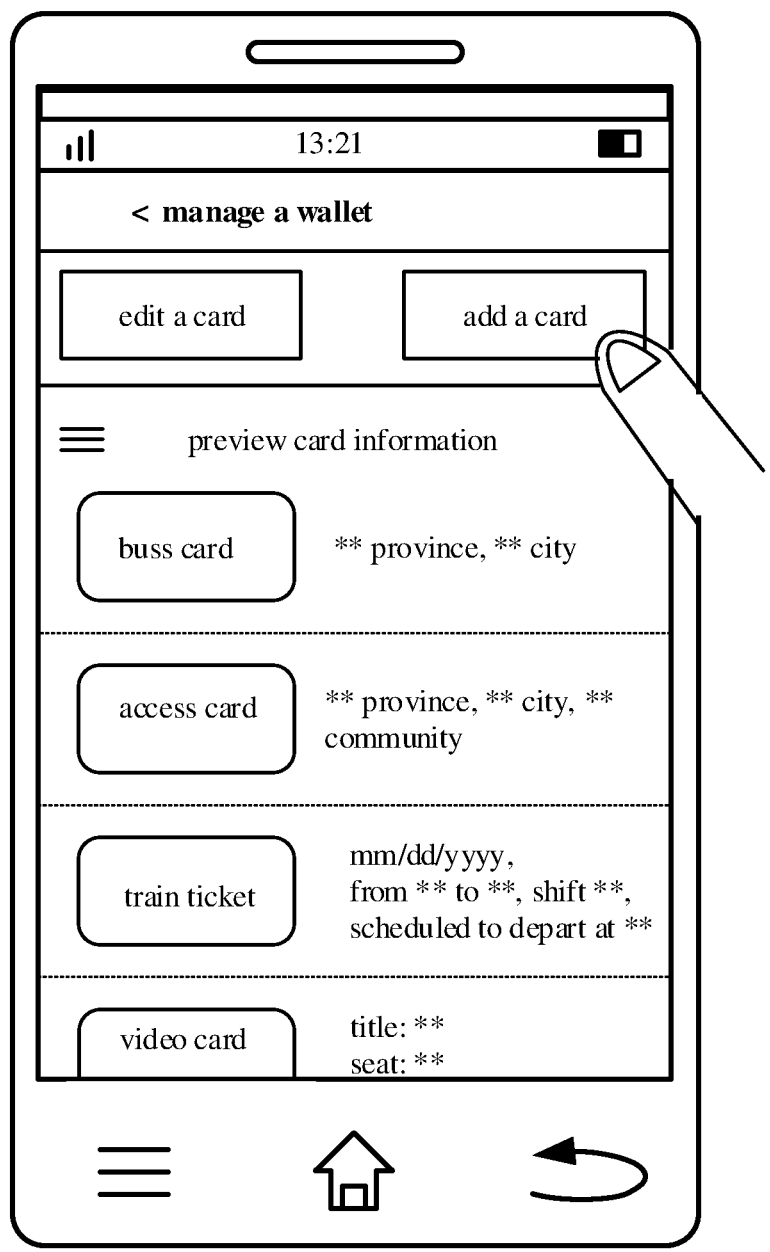
FIG. 4 is a schematic diagram of a user interface for managing a card according to an exemplary embodiment.

FIG. 4 is a schematic diagram of a user interface for managing a card according to an exemplary embodiment. As shown in FIG. 4, the user may trigger a card adding function of the APP by clicking on an add identifier in the interface. The user interface may jump to a card adding interface.

After the user adds a card through a card adding interface, the electronic equipment may send, to a server, the card added. Accordingly, the server may maintain a card set belonging to the user.

Figure 5A:
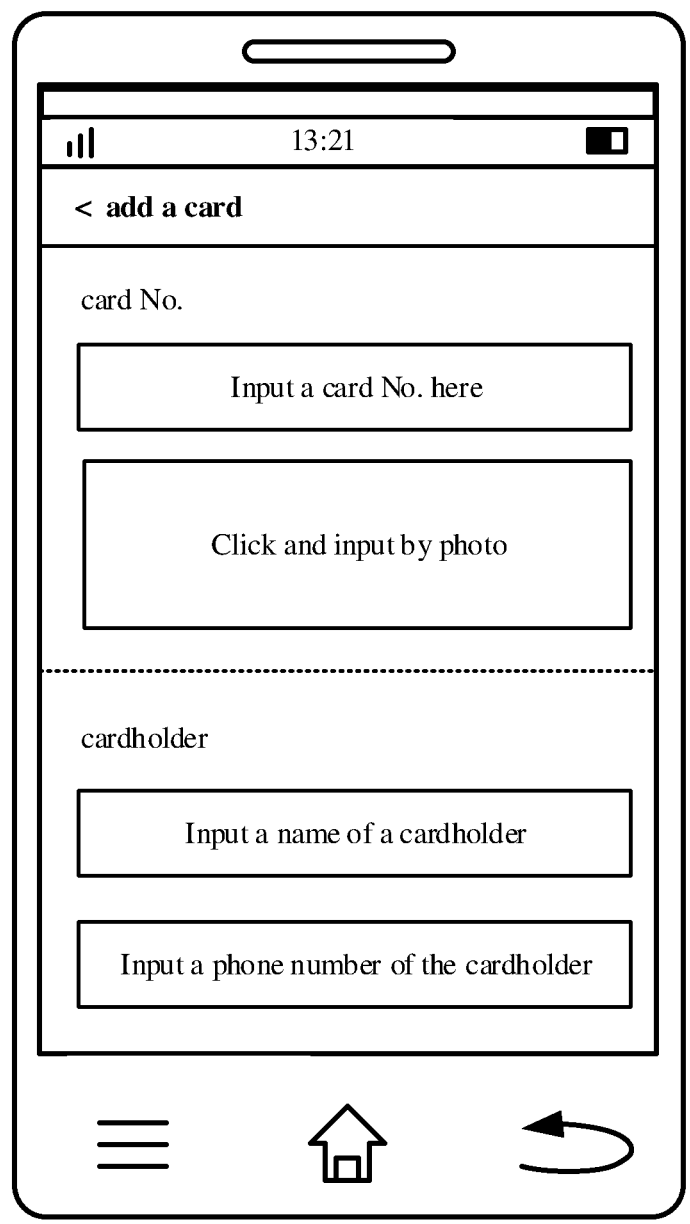
FIG. 5A is a schematic diagram of a user interface for adding a card according to an exemplary embodiment.

FIG. 5A is a schematic diagram of a user interface for adding a card according to an exemplary embodiment. As shown in FIG. 5A, a user may input, in a user interface for adding a card, card information on a card to be added. The user may first determine a card type of a card to be uploaded. Then, the user may be led to an interface for inputting card information. A card type may include an ID card, a ticket card, etc. An ID card may include a bank card, a fuel card, a parking card, a bus card, an access card, a membership card, a score card, etc. The ticket card may include an air ticket, a train ticket, a coupon, a movie ticket, etc. Card information input by the user at the user interface may include a card number, information on a card holder, etc. Information on a card holder may include contact information of the card holder, a name of the card holder, an ID card number of the card holder, etc.

The electronic equipment may acquire a card number by taking a picture of the card number. Then, the electronic equipment may determine the card number of the card to be added by real-time analysis of the picture acquired, simplifying a user operation, improving efficiency in entering a card number.

Figure 5B:
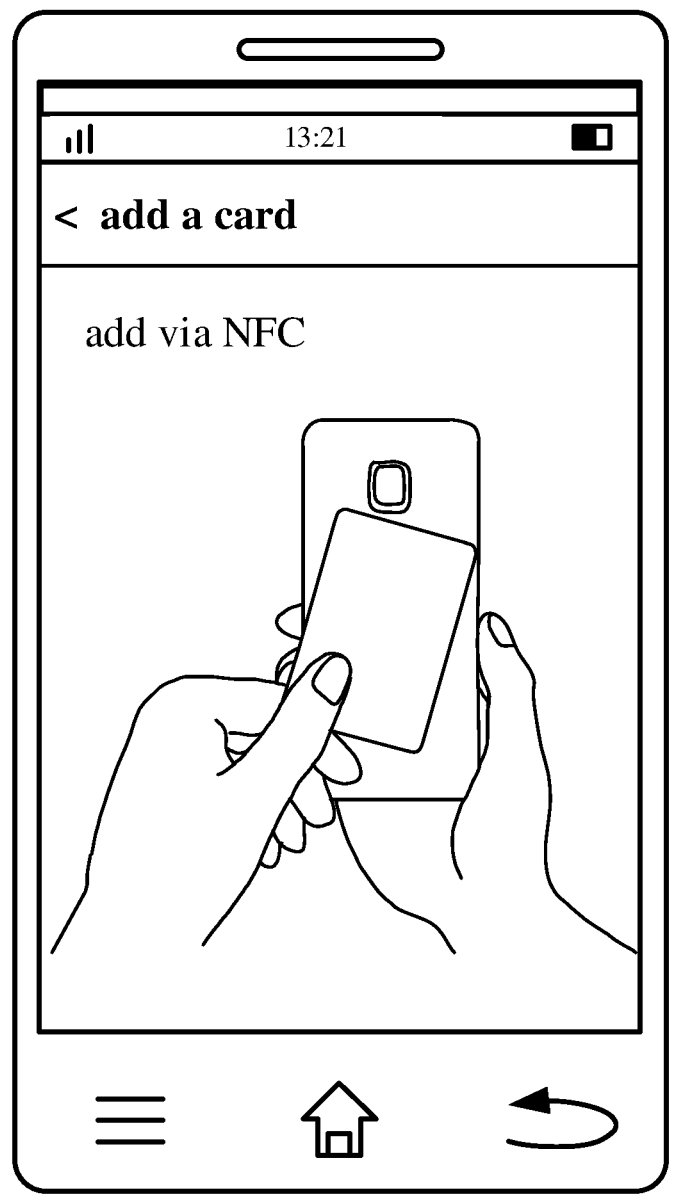
FIG. 5B is a schematic diagram of a user interface for adding a card according to an exemplary embodiment.

The electronic equipment may acquire card information on a card to be added that is held against the electronic equipment. Accordingly, the electronic equipment may read the card information on the card to be added based on an NFC chip. FIG. 5B is a schematic diagram of a user interface for adding a card according to an exemplary embodiment. As shown in FIG. 5B, having jumped to the card adding interface, the electronic equipment may be triggered to activate an NFC function based on the NFC chip. A prompt message prompting how to add a card, such as "Please hold the card against the back of the equipment.", "Hold on, please. The card information is being acquired.", etc., may be displayed in the user interface. The user makes the card held against the back of the electronic equipment. Then, the electronic equipment may acquire, based on NFC, card information pre-stored in a chip of a card to be added. The user does not have to manually input information in a card adding interface, improving efficiency in entering card information.

Similarly, to delete a card or change card information on an existing card in a card set, the user may enter a user interface displaying a card. The user may delete a card or change information on a card by triggering a function for editing a displayed card. During change of card information, the user may manually input card information in a user interface. Alternatively, a user may hold a card for which card information is to be corrected against the electronic equipment. Accordingly, the electronic equipment may read correct card information based on NFC.

To delete a card or change card information with improved efficiency, in case a card held against the electronic equipment is detected, the APP may automatically acquire information related to the card, such as a card number, a name of a card holder, etc. Accordingly, the APP may automatically compare the card information acquired and information related to the card included in the card set. In addition, the electronic equipment may have the APP configured to manage the card set to keep running in the background. Accordingly, the electronic equipment may detect a card held against the electronic equipment in a user interface of the APP.

The electronic equipment may return a feedback to the user based on a result of the comparison. When no card included in the card set corresponds to card information read, the electronic equipment may return a message prompting the user to add a card. Accordingly, the user may decide whether to add the card held against the electronic equipment into the card set. When a card included in the card set corresponds to card information read, the electronic equipment may return different types of prompt messages based on the information corresponding to the card. For example, information on a card holder and information on a card issuer of the card held against the electronic equipment may correspond to information on a card holder and information on a card issuer of a card included in the card set. However, a card number of the card held against the electronic equipment may not correspond to a card number of the card included in the card set. In this case, the electronic equipment may return a message prompting the user to change the card number of the card. Information on a card held against the electronic equipment may be identical to information on a card included in the card set. In this case, the electronic equipment may return a message prompting the user to delete the card. Only information on a card issuer or information on a card holder of a card held against the electronic equipment may correspond to that of a card included in the card set. In this case, the electronic equipment may return a message prompting the user to add a card.

In addition, information on a change in a card may be generated corresponding to the change made by a user to a card set. Then, electronic equipment may send the information on the change in the card to a server. Accordingly, the server may acquire the change made by the user to the card set.

In option 302, a change instruction may be determined based on the information on the change in the card.

The server may generate change instruction corresponding to information on a change in a card sent by the electronic equipment. If the information on the change in the card is information on deletion of the card, a card deletion instruction corresponding to the information on deletion of the card may be generated. If the information on the change in the card is information on addition of the card, a card addition instruction corresponding to the information on addition of the card may be generated.

Information on a change identified by a change instruction generated by a server may include information on a change in a card included in a card set. The information on the change identified by the change instruction may include identifier information corresponding to a changed card set. The server may determine the changed card set according to the information on the change sent by the electronic equipment. Then, the server may determine identifier information corresponding to the changed card set according to a non-contact parameter corresponding to a card included in the changed card set. Accordingly, the state of conflict and/or the state of compatibility between two cards included in the changed card set may be identified by the identifier information re-determined.

The instruction information may include correspondence between changed information and a mode of change. The instruction information may include correspondence between information before a change and information after the change. The instruction information may save information after a change, such as a changed card set, identifier information corresponding to the changed card set, etc. Accordingly, electronic equipment receiving a change instruction may replace, directly based on instruction information in the change instruction, a card set pre-stored in the electronic equipment and identifier information corresponding to the card set. Instruction information may deliver a change instruction in any mode, which is not limited in the embodiments.

In option 303a, the change instruction may be sent to the electronic equipment of the user. Accordingly, the electronic equipment may update the card set.

The server may send the change instruction generated to the electronic equipment used by the user. Accordingly, the electronic equipment may receive the change instruction, and adjust, according to the information on the change corresponding to the change instruction, a stored card set and identifier information corresponding to the stored card set.

The electronic equipment receiving a change instruction may perform update in a number of modes corresponding to instruction information in the change instruction.

In an embodiment, the electronic equipment receiving a change instruction may read instruction information in the change instruction to determine information before the change and information after the change. Then, the electronic equipment may update only information in the electronic equipment corresponding to the information before the change. No change is required for information unrelated to the information before the change recorded in the instruction information. During the change, the electronic equipment may determine stored information corresponding to the acquired information before the change. Then, the electronic equipment may replace the stored information in the electronic equipment with the information after the change.

In an embodiment, instruction information in a change instruction received by the electronic equipment may include information before a change and an amount of change in the information. Likewise, the electronic equipment receiving the change instruction does not have to process information unrelated to the information before the change mentioned in the instruction information. The electronic equipment may process only changed information related to the instruction information. During the change, the electronic equipment may determine stored information corresponding to the acquired information before the change. Then, the electronic equipment may change the stored information according to the amount of change in the information in the instruction information. The electronic equipment may replace the stored information stored in the electronic equipment with the changed stored information.

In an embodiment, the electronic equipment may receive a change instruction. The change instruction may include instruction information. The instruction information may include information after a change. Then, the electronic equipment may replace information stored in the electronic equipment directly with the information after the change included in the instruction information. For example, the electronic equipment may determine a changed card set included in the instruction information and identifier information corresponding to the changed card set. Accordingly, the electronic equipment may replace corresponding information maintained in the electronic equipment with the changed card set determined and the identifier information corresponding to the changed card set.

In option 303b, card information corresponding to the information on the change in the card may be determined.

In option 304b, state information related to the card information in the identifier information may be updated according to the change instruction.

The server may update identifier information corresponding to a maintained card set according to received information on a change. The server may store an updated card set and identifier information corresponding to the updated card set. Accordingly, the server may update and maintain a card set of a user and identifier information corresponding to the card set in real time.

In the embodiments, a user may upload, to a server through electronic equipment used by the user, information on a change in a card set belonging to the user. Accordingly, the server may generate a card change instruction according to acquired information on a change in a card. Then, the server may return the card change instruction to the electronic equipment of the user. Accordingly, the electronic equipment may maintain the card set and identifier information corresponding to the card set according to the card change instruction received. Meanwhile, the server may update, according to received information on a change, a card set maintained by the server and identifier information corresponding to the card set. The server may maintain card information on a card belonging to a user and send information on a change in a card in real time, ensuring that a card set in electronic equipment used by a user includes a complete set of card. Accordingly, a user does not have to manually trigger update of a card set, improving efficiency in updating a card set and identifier information corresponding the card set.

In the second process, an NFC smart card may be configured.

It is desirable to improve efficiency of the user in performing NFC interaction based on NFC of electronic equipment and simplify a user operation. In an embodiment, electronic equipment receiving card information issued by a server may set a card in a card set based on identifier information corresponding to the card set.

A second card compatible with a card selected by a user may be added to an NFC smart card, improving efficiency of electronic equipment in configuring an NFC smart card. In addition, a user may participate in NFC interaction in multiple scenes based on an activated NFC smart card, without having to switch among cards according to a scene of application, improving efficiency of electronic equipment in interaction in a scene.

Figure 6:
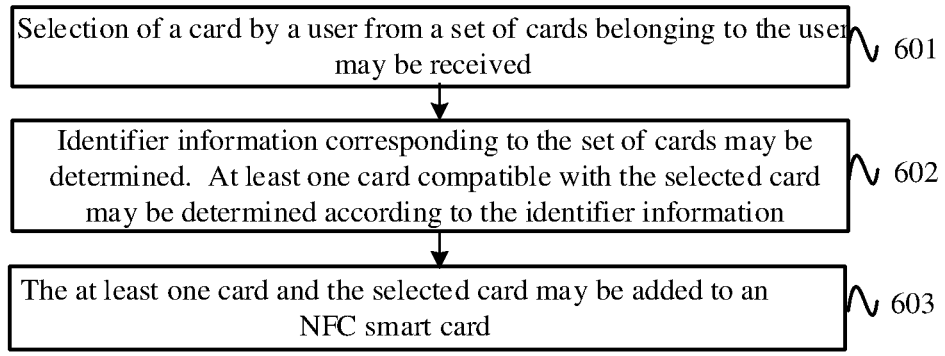
FIG. 6 is a flowchart of a method for configuring an NFC smart card according to an exemplary embodiment.

FIG. 6 is a flowchart of a method for configuring an NFC smart card according to an exemplary embodiment. The method may include the following options.

In option 601, selection of a card by a user from a card set belonging to the user may be received.

A server may send a card set and identifier information corresponding to the card set to electronic equipment used by the user. Accordingly, the electronic equipment may determine a card to be added to an NFC smart card according to the card set received and the identifier information corresponding to the card set.

In an embodiment, the electronic equipment may automatically determine a card to be added to an NFC smart card as needed by the user. Information on selection of a card sent by the user may be received. The information on selection may identify a need of the user to use the card in the card set. The electronic equipment may determine, according to received information on selection, a card selected by the user from the card set belonging to the user.

In an embodiment, the electronic equipment may determine a card to be added to an NFC smart card in a card set according to information on a scene of application. The user may hold the electronic equipment against card reading equipment. The electronic equipment may acquire information on a current scene based on NFC with the card reading equipment. Then, the electronic equipment may determine an NFC card in a card set corresponding to the information on the scene acquired.

In option 602, identifier information corresponding to the card set may be determined. At least one card compatible with the selected card may be determined according to the identifier information.

The electronic equipment may acquire a card set sent by the server and identifier information corresponding to the card set. The server may generate the identifier information according to a non-contact parameter corresponding to a card included in the card set. The server may determine a non-contact parameter of a card and generate identifier information corresponding to a card set as illustrated in the first process, which is not repeated here.

Identifier information received by the electronic equipment may identify a state of conflict between two cards included in a card set, a state of compatibility between two cards included in a card set, or a state of conflict and a state of compatibility between two cards included in a card set. The identifier information may include at least one of the following. When a card selected by a user has no non-contact parameter, the identifier information may identify that a card having no non-contact parameter in a card set is compatible with the card selected by the user. When the card selected by the user has a non-contact parameter, the identifier information may identify that a card having the non-contact parameter in the card set is compatible with the card selected by the user. When the card selected by the user has no non-contact parameter, the identifier information may identify that a card having a non-contact parameter in the card set conflicts with the card selected by the user. When the card selected by the user has a non-contact parameter, the identifier information may identify that a card having a second non-contact parameter differing from the non-contact parameter in the card set conflicts with the card selected by the user.

Identifier information may identify a state of conflict between two cards included in a card set, a state of compatibility between two cards included in a card set, or a state of conflict and a state of compatibility between two cards included in a card set. Identifier information may reflect whether two cards in a card set conflict each other. Thus, the electronic equipment may determine a card compatible with a selected card according to identifier information corresponding to a card set. Accordingly, the electronic equipment may add, to an NFC smart card according to the identifier information, at least two cards in the card set compatible with each other. In case no card in the card set is compatible with the selected card, the electronic equipment may add only the card selected by the user to the NFC smart card.

In an embodiment, the electronic equipment may determine a card compatible with a selected card according to identifier information. The electronic equipment may report the card determined to a user, such as by sending a reminder message, displaying, in the equipment, information related to the card determined, etc. Accordingly, the user may learn a card to be added to the NFC smart card. After receiving an "OK" message from the user, the electronic equipment may determine, as cards to be added to the NFC smart card, the card selected by the user and a card compatible with the card selected by the user as determined based on the identifier information corresponding to the card set. On the other hand, after the electronic equipment receives a "Cancel" message from the user, a user interface may return to a card selecting interface where the user may select a card in the card set again. Accordingly, a card compatible with the selected card may be determined again based on the identifier information corresponding to the card set.

After receiving a card selected by the user, the electronic equipment may display the remaining card(s) other than the card selected by the user. Accordingly, the user may continue to select another card. In addition, the electronic equipment may determine a card conflicting with a card selected by a user based on identifier information corresponding to a card set. The electronic equipment may report, to the user, information on a card conflicting with the selected card, as a reminder to the user that a conflicting card may not be selected and added to the NFC smart card.

The electronic equipment may set a state of a remaining card conflicting with a selected card to be non-selectable. For example, after information on selection of a conflicting card by the user is received, a prompt message such as "The card is not selectable", for example, may pop up. Alternatively, the electronic equipment may display only a remaining card selectable by the user. Alternatively, the electronic equipment may display a card conflicting with the selected card in the display interface in black and white. Alternatively, the electronic equipment may add a non-selectable identifier to a card conflicting with the card selected by the user, improving efficiency of the user in learning a non-selectable card.

The electronic equipment may receive information on selection of a remaining selectable card by a user. The electronic equipment may determine a card corresponding to the received information on selection as a card selected by the user. The electronic equipment may set a selected card as a card to be added to the NFC smart card. Similarly, the electronic equipment may display any remaining card other than the card selected by the user. The electronic equipment may determine a remaining card conflicting with a newly selected card. Then, the electronic equipment may set a state of the remaining card conflicting with the newly selected card to be non-selectable. Likewise, the electronic equipment may have a prompt message such as "The card is not selectable" pop up. Alternatively, the electronic equipment may display only a remaining card selectable by the user. A user may be prompted of a remaining non-selectable card, a mode therein is not elaborated here.

In option 603, the at least one card and the selected card may be added to an NFC smart card.

The electronic equipment may add, to an NFC smart card, a card selected by a user and at least one card determined as compatible with the selected card. The selected card and the compatible card in the NFC smart card may both be in the activated state. Accordingly, the user may perform NFC interaction with card reading equipment based on the cards added to the NFC smart card in the electronic equipment.

A card may be added to an NFC smart card in a number of modes. In an embodiment, the electronic equipment may determine scene token information corresponding to a received card. Then, the electronic equipment may add, to the NFC smart card, the scene token information to be determined. Accordingly, while the electronic equipment performs interaction based on the NFC smart card, the card reading equipment may perform interaction authorization based only on the scene token information sent by the electronic equipment through NFC, improving efficiency in authorization.

In an embodiment, the electronic equipment may receive card information on a card to be added as input by a user. The electronic equipment may upload the card information to a server. The server may maintain the card information input by the user. The server may add received information related to a card input by the user to a card set issued to the electronic equipment used by the user. While configuring the NFC smart card, the electronic equipment may add the card information sent by the server to the NFC smart card. Accordingly, while the electronic equipment performs interaction based on the NFC smart card, the card reading equipment may certify the card information acquired based on NFC.

In the embodiments, the electronic equipment may receive a card set sent by a server and identifier information corresponding to the card set. The electronic equipment may determine, according to the identifier information, at least one card compatible with a selected card. Then, the electronic equipment may add the card selected by a user and the at least one compatible card to an NFC smart card, simplifying a user operation, improving efficiency of the user in interaction in NFC based on the electronic equipment.

In the third process, switch among NFC cards may be performed.

When interaction by an NFC smart card fails, or a user needs to use a non-smart NFC card other than the NFC smart card, the user may again determine a non-smart NFC card in a card set for near field interaction, meeting a user need for applying near field interaction based on different NFC cards in one scene of application.

Figure 7:
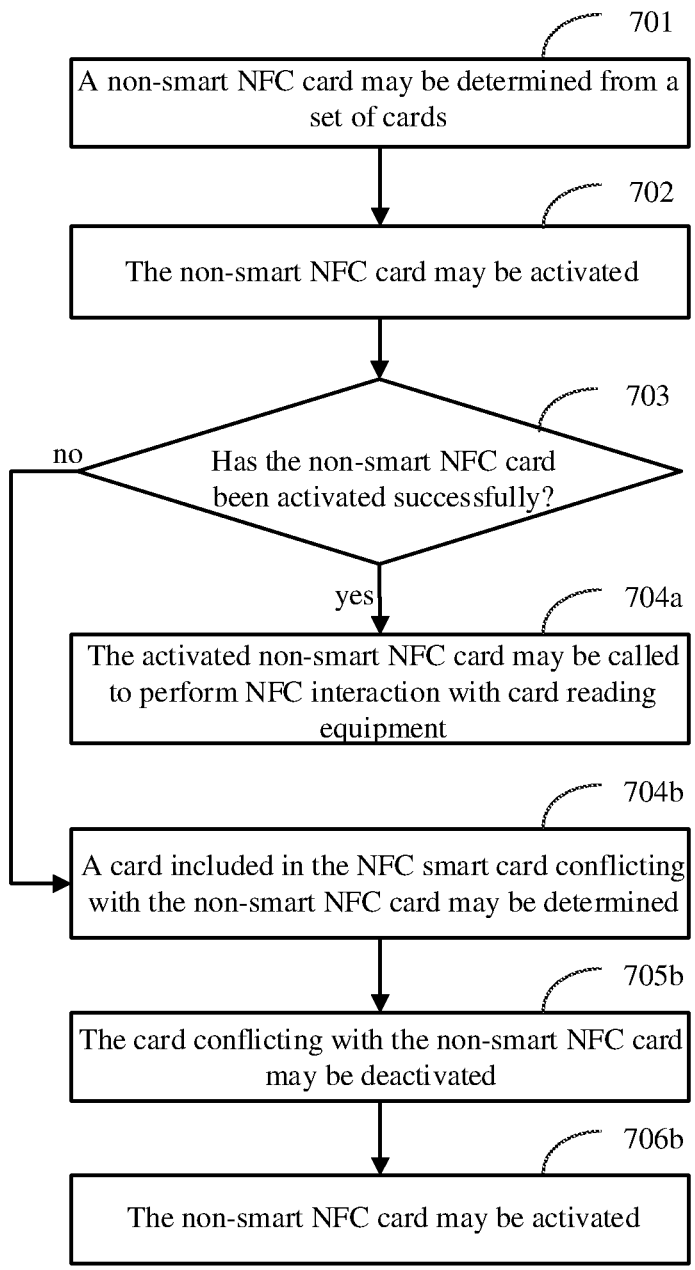
FIG. 7 is a flowchart of a method for NFC card switch according to an exemplary embodiment.

FIG. 7 is a flowchart of a method for NFC card switch according to an exemplary embodiment. Referring to FIG. 7, the method may include the following options.

In option 701, a non-smart NFC card may be determined from a card set.

Information on a virtual card maintained by an NFC chip in electronic equipment may be divided into a smart NFC card and a non-smart NFC card. A smart NFC card may include a card selected by a user and a card compatible with the card selected by the user. By default, a card set in the NFC smart card may be in the activated state. A non-smart NFC card not set in the NFC smart card may not be in the activated state.

There may be multiple triggering modes for determining a non-smart NFC card from a card set. In an embodiment, the user may select, through the electronic equipment, an NFC card to switch to. The electronic equipment may receive information on selection of an NFC card by the user. The electronic equipment may generate a switch instruction based on the information on selection of the NFC card. Then, an NFC chip may determine the NFC card corresponding to the switch instruction as the non-smart NFC card determined from the card set.

In an embodiment, the user may send a switch instruction through the electronic equipment. The user may hold the electronic equipment against card reading equipment to acquire, through NFC, information on a current scene, such as scene identifier information. Then, the electronic equipment may automatically determine a non-smart NFC card in the card set corresponding to the acquired information on the scene.

If there is only one non-smart NFC card in the card set corresponding to the information on the scene, the electronic equipment may directly determine the non-smart NFC card as the non-smart NFC card determined from the card set. If multiple non-smart NFC cards in the card set correspond to the information on the scene, the electronic equipment may report the non-smart NFC cards corresponding to the information on the scene to the user, such as by displaying, in the display interface of the electronic equipment, the non-smart NFC cards corresponding to the information on the scene, or sending information on the non-smart NFC cards corresponding to the information on the scene to the user. Accordingly, the user may touch and select an NFC card displayed in the display interface. Alternatively, the user may respond to received information corresponding to the non-smart NFC cards. Accordingly, the electronic equipment may acquire information on user selection of multiple non-smart NFC cards corresponding to the information on the scene. Then, the electronic equipment may determine the non-smart NFC cards corresponding to the received selection as the non-smart NFC cards in the card set that correspond to the information on the scene.

In an embodiment, the electronic equipment may determine that communication interaction based on a smart NFC card has failed for more than a threshold number of times. Then, the electronic equipment may automatically determine, according to a scene identifier corresponding to the communication interaction, an NFC card corresponding to the scene identifier and not included in the NFC smart card as a non-smart NFC card.

The user may hold the electronic equipment against card reading equipment. When starting interaction with the card reading equipment based on NFC, the electronic equipment may count a number of response messages generating communication interaction abnormalities. When receiving a number of messages of communication interaction abnormalities exceeding a threshold, the electronic equipment may determine information on a scene of current communication interaction based on a cache record. Then, the electronic equipment may determine an NFC card corresponding to the scene identifier and not included in the NFC smart card as a non-smart NFC card.

In option 702, the non-smart NFC card may be activated.

In option 703, it may be determined whether the non-smart NFC card has been activated successfully. If it has been activated successfully, the flow may go to option 704a. Otherwise if it has not been activated successfully, the flow may go to option 704b.

The electronic equipment may determine and activate a non-smart NFC card. Then, the electronic equipment may perform communication interaction with card reading equipment according to the activated non-smart NFC card.

In option 704a, in case that a response message of successful activation is received, the activated non-smart NFC card may be invoked to perform NFC interaction with the card reading equipment. The response message of successful activation may indicate that the non-smart NFC card is compatible with all cards included in the smart NFC card.

In option 704*b*, in case that a response message of an activation failure is received, a card included in the NFC smart card conflicting with the non-smart NFC card may be determined.

In option 705*b*, the card conflicting with the non-smart NFC card may be deactivated.

In an embodiment, information on the conflicting card to be deactivated may be recorded. Accordingly, the deactivated conflicting card may be activated again based on the recorded information in case the activated non-smart NFC card has been deactivated.

In option 706*b*, in case the conflicting card is deactivated, the non-smart NFC card may be activated.

In an embodiment, an activated non-smart NFC card may be deactivated in case of receiving at least one of an instruction message of card switch, an instruction message of exiting a current card swiping page, an instruction message of completing the NFC interaction, etc.

After NFC interaction based on a non-smart NFC card completes, the user may exit a user interface based on the non-smart NFC card by clicking on a key triggering exit of the user interface. The key may be a virtual key or a physical key in the electronic equipment.

Similarly, in case the user needs to change a non-smart NFC card performing NFC interaction, the user may switch from the non-smart NFC card being used for NFC to another card in a card set by clicking on a key configured to trigger card switch. For example, after a switch instruction sent by the user through the electronic equipment is received, the electronic equipment may re-activate a card included in an NFC smart card. Accordingly, the electronic equipment may perform NFC interaction based on the NFC smart card.

In addition, the electronic equipment may automatically deactivate a non-smart NFC card based on an instruction message of NFC interaction completion, improving efficiency of the electronic equipment in deactivating a non-smart NFC card.

In an embodiment, after deactivating a non-smart NFC card, the electronic equipment may automatically activate a smart NFC card, meeting a user demand for maintaining real-time response by the smart NFC card in use, improving efficiency of the electronic equipment in responding to NFC.

In an embodiment, after completing interaction with card reading equipment in a scene, the electronic equipment may report to the user a card used for interaction in the scene. Accordingly, the user of the electronic equipment may clearly know the card used for the interaction. After completing interaction with card reading equipment in a scene, the electronic equipment may notify a card used such as by an APP notification, a short message, etc. The card reading equipment may display a card used for interaction, such as information capable of identifying a card identification, which may be a face of the card, a name of a card issuer, etc.

In an embodiment, a smart NFC card may be included in an NFC smart card. When the electronic equipment performs NFC interaction with card reading equipment based on the NFC smart card, this may be equivalent to NFC interaction with the card reading equipment based on the corresponding smart NFC card included in the NFC smart card. Accordingly, the electronic equipment may implement NFC interaction in multiple scenes based on the NFC smart card, without having to switch between cards according to a scene in the multiple scenes, improving efficiency in NFC interaction.

For example, a card set belonging to a user A may include a bus card a, a bus card b, a bus card c, and a bank card d. Only the bus card a and the bank card d may be configured in an NFC smart card. Accordingly, the bus card a and the bank card d may be smart NFC cards. The bus card b and the bus card c may be non-smart NFC cards. During use, the user may interact with card reading equipment of a bus based on the NFC smart card when taking the bus, achieving an effect of swiping the bus card a. The user may interact with NFC supporting card reading equipment of a bank based on the NFC smart card, achieving an effect of payment by swiping the bank card d.

A user may switch to a non-smart NFC card in a card set to perform communication interaction as needed, of course. For example, the user A may decide to use a non-smart NFC card, namely the bus card b, in the card set to perform interaction and communication. Accordingly, the electronic equipment may activate the bus card b as a non-smart NFC card. When receiving a response message of successful activation, the electronic equipment may use the active bus card b to perform NFC interaction.

In the embodiments, the electronic equipment may determine, as needed by a user, to activate a non-smart NFC card in a card set. Then, the electronic equipment may activate the non-smart NFC card. The electronic equipment may perform NFC interaction according to the activated non-smart NFC card, implementing a flexible change in a card used for NFC interaction, meeting a user demand for performing communication based on different cards.

The above methods are described as a combination of a series of options. A person having ordinary skill in the art should know that the present disclosure is not limited to the sequence of the options as described. Some options may be executed in a different sequence, or simultaneously, according to actual needs.

Figure 8:
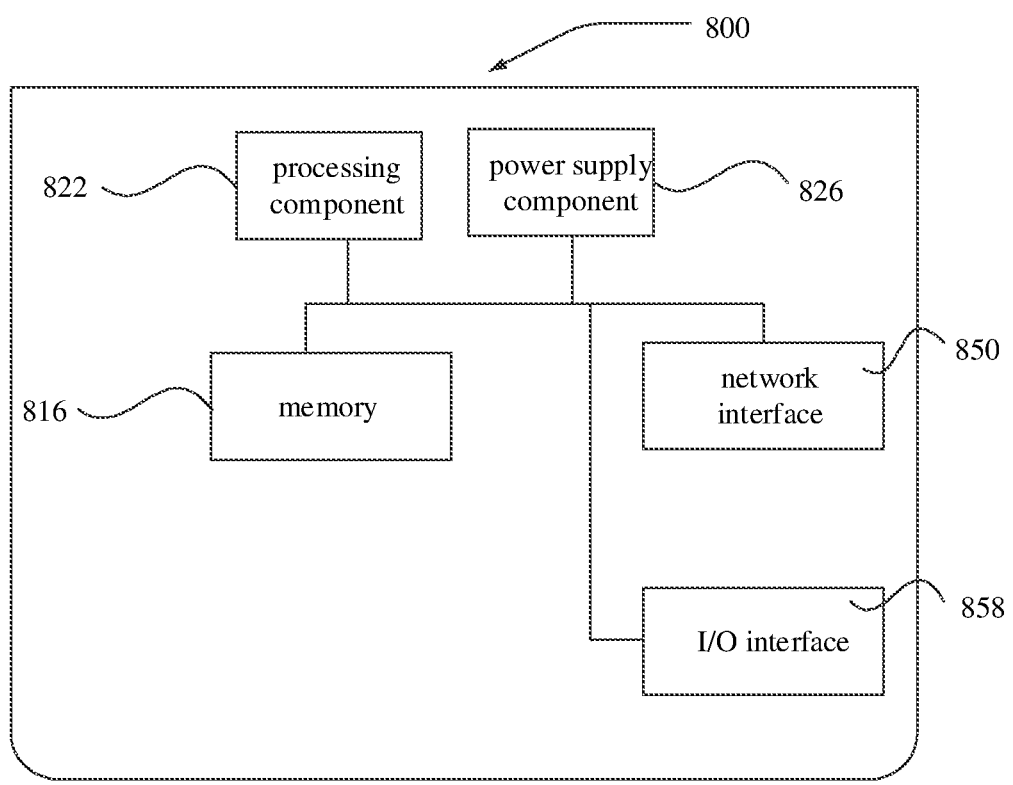
FIG. 8 is a schematic diagram of a preprocessing device for configuring an NFC smart card according to an exemplary embodiment.

FIG. 8 is a schematic diagram of a device 800 for configuring an NFC smart card according to an exemplary embodiment. As shown in FIG. 8, for example, the device 800 may be provided as any of the above described server or electronic equipment. Referring to FIG. 8, the device 800 may include a processing component 822. The processing component may include one or more processors. The device 800 may include a memory resource represented by memory 816. The memory 816 may be configured to store an instruction executable by the processing component 822, such as an APP. The APP stored in the memory 816 may include one or more modules. Each of the modules may correspond to a set of instructions. In addition, the processing component 822 may be configured to execute instructions to perform the above described methods.

The device 800 may further include a power supply component 826. The power supply component may be configured to manage power of the device 800. The device 800 may further include a wired or wireless network interface 850 configured to connect the device 800 to a network. The device 800 may further include an Input Output (I/O) interface 858. The device 800 may operate based on an operating system stored in the memory 816, such as an Android, an iOS, a Windows Server™, a Mac OS X™, a Unix™, a Linux™, a FreeBSD™, etc.

In an exemplary embodiment, a non-transitory computer-readable storage medium including instructions, such as the memory 816 including instructions, may be provided. The instructions may be executed by the processing component 822 of the device 800 to perform the above described methods. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, etc.

In an exemplary embodiment, the device 800 may be implemented by one or more Application Specific Integrated Circuits (ASICs), Digital Signal Processors (DSPs), Digital Signal Processing Equipment (DSPDs), Programmable Logic Equipment (PLDs), Field Programmable Gate Arrays (FPGAs), controllers, micro-controllers, microprocessors or other electronic components.

Figure 9:
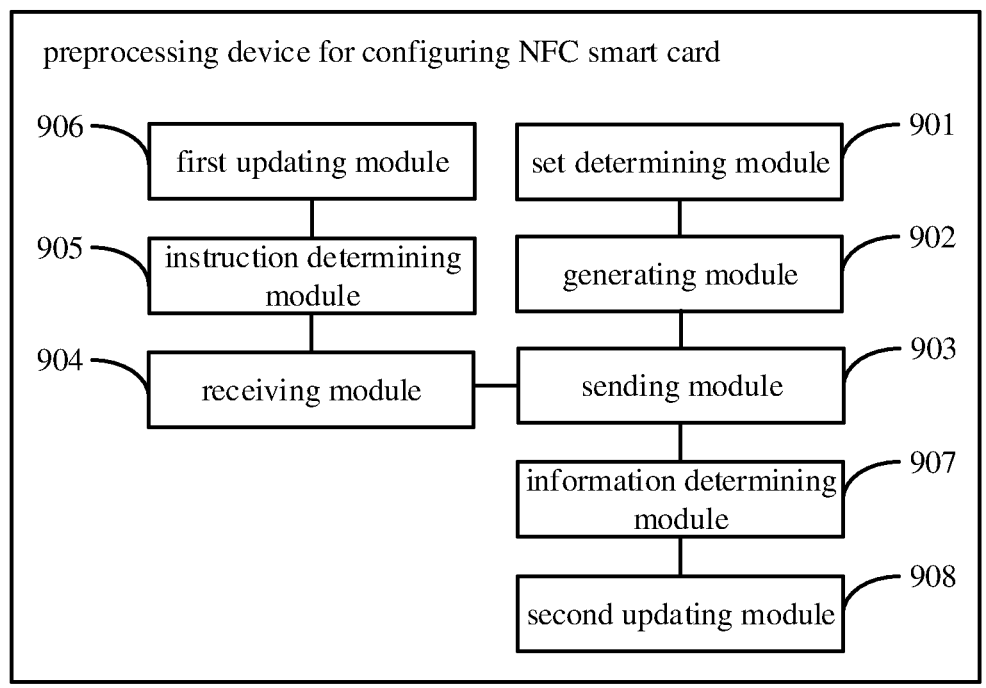
FIG. 9 is a block diagram of a preprocessing device for configuring an NFC smart card according to an exemplary embodiment.

FIG. 9 is a block diagram of a preprocessing device for configuring an NFC smart card according to an exemplary embodiment. Referring to FIG. 9, the preprocessing device may include a set determining module 901, a generating module 902, and a sending module 903.

The set determining module 901 is configured to determine a card set belonging to a user.

The generating module 902 is configured to generate identifier information corresponding to the card set according to a non-contact parameter corresponding to a card included in the card set. The identifier information is configured to identify a state of conflict and/or a state of compatibility between two cards included in the card set.

The sending module 903 is configured to send the identifier information to electronic equipment used by the user. Accordingly, the electronic equipment may add, to an NFC smart card according to the identifier information, at least two cards compatible with each other in the card set.

The preprocessing device may further include a receiving module 904, an instruction determining module 905, and a first updating module 906.

The receiving module 904 may be configured to receive information on a change in a card of the user.

The instruction determining module 905 may be configured to determine a change instruction based on the information on the change in the card.

The first updating module 906 may be configured to send the change instruction to the electronic equipment of the user. Accordingly, the electronic equipment may update, according to the change instruction, a stored card set and state information related to the card to be updated in the identifier information.

The preprocessing device may further include an information determining module 907 and a second updating module 908.

The information determining module 907 may be configured to determine card information corresponding to the information on the change in the card.

The second updating module 908 may be configured to update, according to the change instruction, state information related to the card information in the identifier information.

Figure 10:
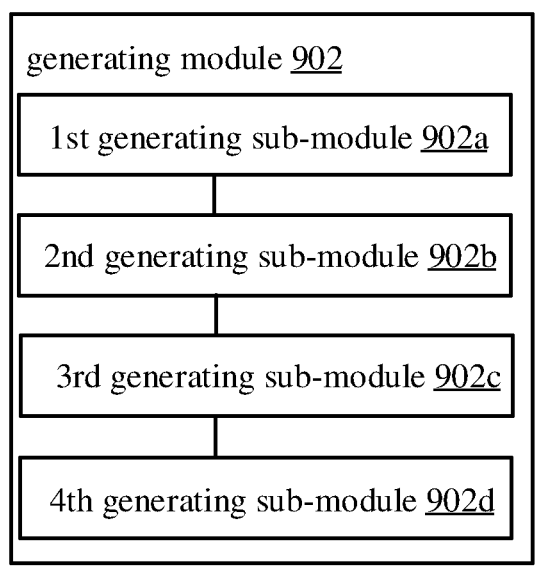
FIG. 10 is a block diagram of a preprocessing device for configuring an NFC smart card according to an exemplary embodiment.

FIG. 10 is a block diagram of a preprocessing device for configuring an NFC smart card according to an exemplary embodiment. As shown in FIG. 10, based on the embodiment shown in FIG. 9, the generating module 902 may include at least one of a first generating sub-module 902a, a second generating sub-module 902b, a third generating sub-module 902c, and a fourth generating sub-module 902d.

The first generating sub-module 902a may be configured to generate the identifier information identifying the state of compatibility between two cards both with no non-contact parameter in the card set.

The second generating sub-module 902b may be configured to generate the identifier information identifying the state of compatibility between two cards with identical non-contact parameters in the card set.

The third generating sub-module 902c may be configured to generate the identifier information identifying the state of conflict between two cards with different non-contact parameters in the card set.

The fourth generating sub-module 902d may be configured to generate the identifier information identifying the state of conflict between a card with no non-contact parameter and a card with a non-contact parameter in the card set.

Figure 11:
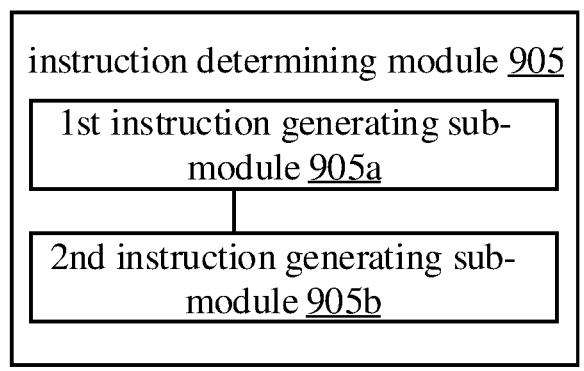
FIG. 11 is a block diagram of a preprocessing device for configuring an NFC smart card according to an exemplary embodiment.

FIG. 11 is a block diagram of a preprocessing device for configuring an NFC smart card according to an exemplary embodiment. As shown in FIG. 11, based on the embodiment shown in FIG. 9, the instruction determining module 905 may include a first instruction generating sub-module 905a or a second instruction generating sub-module 905b.

The first instruction generating sub-module 905a may be configured to, in response to the information on the change in the card being information on deletion of the card, generate a card deletion instruction corresponding to the information on deletion of the card.

The second instruction generating sub-module 905b may be configured to, in response to the information on the change in the card being information on addition of the card, generate a card addition instruction corresponding to the information on addition of the card.

For detailed operations of the modules in the device, reference may be made to the method embodiments. The modules described herein as separate parts may or may not be physically separate, and may be located in one place, or distributed over multiple networks. Some or all of the modules herein may be selected as needed.

Other implementations of the present disclosure will be apparent to a person having ordinary skill in the art that has considered the specification and practiced the disclosure. The disclosure is intended to cover any variation, use, or adaptation of the disclosure following the general principles of the disclosure and including such departures from the disclosure as come within common knowledge or customary practice in the art. The embodiments are exemplary only, with a true scope and spirit of the disclosure being indicated by the appended claims.

The disclosure is not limited to the exact construction that has been described above and illustrated in the accompanying drawings, and that various modifications and changes can be made to the disclosure without departing from the scope of the disclosure. The scope of the disclosure is limited only by the appended claims.

What is claimed is:

1. A preprocessing method for configuring a near field communication (NFC) smart card, applied to a server, the method comprising:
   determining a card set belonging to a user;
   generating identifier information corresponding to the card set according to a non-contact parameter corresponding to a card included in the card set, the identifier information identifying at least one of a state of conflict or a state of compatibility between two cards included in the card set;
   sending the identifier information to electronic equipment used by the user, such that the electronic equipment adds, to an NFC smart card according to the identifier information, at least two cards compatible with each other in the card set;
   receiving information on a change in a card of the user;
   determining a change instruction based on the information on the change in the card; and
   sending the change instruction to the electronic equipment of the user, such that the electronic equipment updates, according to the change instruction, the card set and state information related to the card in the identifier information, wherein the determining the change instruction based on the information on the change in the card comprises one of:

in response to the information on the change in the card being information on deletion of the card, generating a card deletion instruction corresponding to the information on deletion of the card; or in response to the information on the change in the card being information on addition of the card, generating a card addition instruction corresponding to the information on addition of the card.

2. The preprocessing method of claim 1, wherein the generating the identifier information corresponding to the card set according to the non-contact parameter corresponding to the card included in the card set comprises at least one of:

generating the identifier information identifying the state of compatibility between two cards both with no non-contact parameter in the card set;

generating the identifier information identifying the state of compatibility between two cards with identical non-contact parameters in the card set;

generating the identifier information identifying the state of conflict between two cards with different non-contact parameters in the card set; or generating the identifier information identifying the state of conflict between a card with no non-contact parameter and a card with a non-contact parameter in the card set.

3. The preprocessing method of claim 1, further comprising:

determining card information corresponding to the information on the change in the card; and updating, according to the change instruction, state information related to the card information in the identifier information.

4. A server, comprising:

a processor; and a memory storing an instruction executable by the processor, wherein the processor is configured to perform:

determining a card set belonging to a user;

generating identifier information corresponding to the card set according to a non-contact parameter corresponding to a card included in the card set, the identifier information identifying at least one of a state of conflict or a state of compatibility between two cards included in the card set;

sending the identifier information to electronic equipment used by the user, such that the electronic equipment adds, to an NFC smart card according to the identifier information, at least two cards compatible with each other in the card set;

receiving information on a change in a card of the user;

determining a change instruction based on the information on the change in the card; and sending the change instruction to the electronic equipment of the user, such that the electronic equipment updates, according to the change instruction, the card set and state information related to the card in the identifier information, wherein the determining the change instruction based on the information on the change in the card comprises one of:

in response to the information on the change in the card being information on deletion of the card, generating a card deletion instruction corresponding to the information on deletion of the card; or in response to the information on the change in the card being information on addition of the card, generating a card addition instruction corresponding to the information on addition of the card.

5. The server of claim 4, wherein the generating the identifier information corresponding to the card set according to the non-contact parameter corresponding to the card included in the card set comprises at least one of:

generating the identifier information identifying the state of compatibility between two cards both with no non-contact parameter in the card set;

generating the identifier information identifying the state of compatibility between two cards with identical non-contact parameters in the card set;

generating the identifier information identifying the state of conflict between two cards with different non-contact parameters in the card set; or generating the identifier information identifying the state of conflict between a card with no non-contact parameter and a card with a non-contact parameter in the card set.

6. The server of claim 4, wherein the processor is further configured to perform:

determining card information corresponding to the information on the change in the card; and updating, according to the change instruction, state information related to the card information in the identifier information.

7. A non-transitory computer-readable storage medium having stored thereon instructions that, when executed by a processor of a server, cause the server to perform a preprocessing method for configuring a near field communication (NFC) smart card, the preprocessing method comprising:

determining a card set belonging to a user;

generating identifier information corresponding to the card set according to a non-contact parameter corresponding to a card included in the card set, the identifier information identifying at least one of a state of conflict or a state of compatibility between two cards included in the card set;

sending the identifier information to electronic equipment used by the user, such that the electronic equipment adds, to an NFC smart card according to the identifier information, at least two cards compatible with each other in the card set;

receiving information on a change in a card of the user;

determining a change instruction based on the information on the change in the card; and sending the change instruction to the electronic equipment of the user, such that the electronic equipment updates, according to the change instruction, the card set and state information related to the card in the identifier information, wherein the determining the change instruction based on the information on the change in the card comprises one of:

in response to the information on the change in the card being information on deletion of the card, generating a card deletion instruction corresponding to the information on deletion of the card; or in response to the information on the change in the card being information on addition of the card, generating a card addition instruction corresponding to the information on addition of the card.

8. The storage medium of claim 7, wherein the generating the identifier information corresponding to the card set according to the non-contact parameter corresponding to the card included in the card set comprises at least one of:
  generating the identifier information identifying the state of compatibility between two cards both with no non-contact parameter in the card set;
  generating the identifier information identifying the state of compatibility between two cards with identical non-contact parameters in the card set;
  generating the identifier information identifying the state of conflict between two cards with different non-contact parameters in the card set; or
  generating the identifier information identifying the state of conflict between a card with no non-contact parameter and a card with a non-contact parameter in the card set.

9. The storage medium of claim 7, wherein the method further comprises:
  determining card information corresponding to the information on the change in the card; and
  updating, according to the change instruction, state information related to the card information in the identifier information.

* * * * *